(12) United States Patent
Moose et al.

(10) Patent No.: US 10,454,122 B2
(45) Date of Patent: Oct. 22, 2019

(54) REINFORCED ELECTRODE ASSEMBLY

(71) Applicant: GM GLOBAL TECHNOLOGY OPERATIONS LLC, Detroit, MI (US)

(72) Inventors: Scott C. Moose, Victor, NY (US); John P. Healy, Pittsford, NY (US); Bradley M. Houghtaling, Rochester, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 267 days.

(21) Appl. No.: 15/599,978

(22) Filed: May 19, 2017

(65) Prior Publication Data

US 2017/0256809 A1 Sep. 7, 2017

Related U.S. Application Data

(60) Division of application No. 13/836,894, filed on Mar. 15, 2013, now Pat. No. 9,722,269, and a division of application No. 13/434,898, filed on Mar. 30, 2012, now Pat. No. 9,780,399, which is a continuation-in-part of application No. 13/005,587, filed on Jan. 13, 2011, now Pat. No. 9,419,286, which is a continuation-in-part of application No. 11/972,817, filed on Jan. 11, 2008, now Pat. No. 9,647,274.

(51) Int. Cl.
| | |
|---|---|
| *H01M 8/1004* | (2016.01) |
| *H01M 8/1058* | (2016.01) |
| *H01M 8/00* | (2016.01) |
| *H01M 4/88* | (2006.01) |
| *H01M 8/1069* | (2016.01) |
| *H01M 8/1018* | (2016.01) |

(52) U.S. Cl.
CPC ....... *H01M 8/1004* (2013.01); *H01M 4/8825* (2013.01); *H01M 4/8892* (2013.01); *H01M 8/00* (2013.01); *H01M 8/1058* (2013.01); *H01M 8/1069* (2013.01); *H01M 2008/1095* (2013.01); *Y02P 70/56* (2015.11)

(58) Field of Classification Search
CPC ....... H01M 2008/1095; H01M 4/8825; H01M 4/8892; H01M 8/00; H01M 8/1004; H01M 8/1058; H01M 8/1069; Y02P 70/56

See application file for complete search history.

(56) References Cited

U.S. PATENT DOCUMENTS

2007/0275291 A1* 11/2007 Gu ........................... B32B 5/16
429/450
2012/0321988 A1* 12/2012 Sharman ............. H01M 4/8605
429/480

\* cited by examiner

*Primary Examiner* — Carlos Barcena
(74) *Attorney, Agent, or Firm* — Quinn IP Law

(57) ABSTRACT

Disclosed are fuel cell systems, reinforced membrane electrode assemblies, and methods for fabricating a reinforced membrane electrode assembly. In an example, a disclosed method includes depositing an electrode ink onto a first substrate to form a first electrode layer, and applying a first porous reinforcement layer onto a surface of the first electrode layer to form a first catalyst coated substrate. The method also includes depositing a first ionomer solution onto the first catalyst coated substrate to form a first ionomer layer. A membrane porous reinforcement layer is applied onto a surface of the first ionomer layer to form a reinforced membrane layer.

20 Claims, 10 Drawing Sheets

REINFORCED ELECTRODE ASSEMBLY

CLAIM OF PRIORITY AND CROSS-REFERENCE TO RELATED APPLICATIONS

This application is a divisional of U.S. patent application Ser. No. 13/836,894, filed Mar. 15, 2013, now allowed, which is a continuation-in-part of U.S. patent application Ser. No. 13/434,898, filed Mar. 30, 2012, now allowed, a continuation-in-part of U.S. patent application Ser. No. 13/005,587, filed Jan. 13, 2011, now U.S. Pat. No. 9,419,286, and a continuation-in-part of U.S. patent application Ser. No. 11/972,817, filed Jan. 11, 2008, now U.S. Pat. No. 9,647,274, all of which are incorporated herein by reference in their respective entireties and for all purposes.

INTRODUCTION

The present disclosure relates generally to fuel cells and, more particularly, to membrane assemblies used in fuel cells, subassemblies thereof, and to methods of making membrane assemblies and subassemblies for fuel cells.

Fuel cells, which are sometimes referred to as electrochemical conversion cells, produce electrical energy by processing reactants, for example, through the oxidation and reduction of hydrogen and oxygen. Hydrogen may be a very attractive fuel because it is clean and it may be used to produce electricity efficiently in a fuel cell. The automotive industry has expended significant resources in the development of hydrogen fuel cells as a source of power for vehicles. Vehicles powered by hydrogen fuel cells could be more efficient and generate fewer emissions than today's vehicles employing internal combustion engines.

In some fuel cell systems, hydrogen or a hydrogen-rich gas is supplied as a reactant through a flow path to the anode side of a fuel cell, while oxygen (such as in the form of atmospheric oxygen) is supplied as a reactant through a separate flow path to the cathode side of the fuel cell. The anode and cathode facilitate the electrochemical conversion of the reactants into electrons and positively charged ions (for the hydrogen), and negatively charged ions and ultimately water (for the oxygen). An electrolyte layer separates the anode from the cathode to allow the selective passage of ions to from the anode to the cathode while simultaneously prohibiting the passage of the generated electrons. These electrons are forced to flow through an external electrically-conductive circuit (such as a load) to perform useful work before recombining with the charged ions at the cathode. The combination of the positively and negatively charged ions at the cathode results in the production of non-polluting water as a byproduct of the reaction.

A conventional proton exchange membrane ("PEM") fuel cell may comprise a polymer electrolyte membrane (or a proton exchange membrane) with electrode layers on both sides of the polymer membrane to form a membrane electrode assembly ("MEA"). The membrane electrode assembly may be positioned between a pair of gas diffusion media layers, and a cathode plate and an anode plate are placed outside of the gas diffusion media layers. The components are compressed to form a fuel cell.

Some fuel cell designs suffer from drawbacks that may decrease the life of a fuel cell. For example, a phenomenon known as "mud cracking" may occur during formation of catalyst ink electrodes. Mud cracking is a network of cracks formed in the surface of the catalyst electrode. The network of cracks may potentially impact the performance of the fuel cell, including, for example, reducing the effective stiffness of the electrode. In addition, during operation of fuel cells, the membrane may experience cracking and failure due to a lack of mechanical integrity.

SUMMARY

Aspects of the present disclosure are directed to methods of fabricating a reinforced membrane electrode assembly. In an example, a method is disclosed that includes depositing an electrode ink onto a first substrate to form a first electrode layer, and applying a first porous reinforcement layer on the first electrode layer to form a first catalyst coated substrate. The electrode ink is composed of a proton-transmissive ionomer and a catalyst. A first ionomer solution is deposited onto the first catalyst coated substrate to form a first ionomer layer, and a membrane porous reinforcement layer is applied onto the first ionomer layer to form a reinforced membrane layer.

Other aspects of the present disclosure are directed to reinforced electrode assemblies for fuel cells. In an example, a reinforced electrode assembly includes a first catalyst coated substrate, and a reinforced membrane layer positioned on the first catalyst coated substrate. The first catalyst coated substrate includes a first electrode layer on a first substrate, and a first porous reinforcement layer on the first electrode layer. The electrode ink includes a proton-transmissive ionomer and a catalyst. The reinforced membrane layer includes a first ionomer layer on the first porous reinforcement layer, and a membrane porous reinforcement layer on the first ionomer layer.

Additional aspects of the present disclosure are directed to fuel cells. In an example, a fuel cell is disclosed that includes a reinforced electrode assembly composed of a first catalyst coated substrate, a reinforced membrane layer positioned on the first catalyst coated substrate, and a second catalyst coated substrate positioned on the reinforced membrane layer, and a pair of plates positioned on a substrate side of the first catalyst coated substrate and the second catalyst coated substrate. The first catalyst coated substrate includes a first electrode layer on a first substrate, and a first porous reinforcement layer on the first electrode layer. The reinforced membrane layer includes a first ionomer layer and a membrane porous reinforcement layer on the first ionomer layer. The second catalyst coated substrate includes a second electrode layer on a second substrate and a second porous reinforcement layer on the second electrode layer. A pair of plates are positioned on a substrate side of the first catalyst coated substrate and the second catalyst coated substrate.

Additional features and advantages of the embodiments for fuel cells, membrane electrode assemblies, and methods for fabricating membrane electrode assemblies described herein will be set forth in the detailed description which follows, and in part will be readily apparent to those skilled in the art from that description or recognized by practicing the embodiments described herein, including the detailed description which follows, the claims, and the appended drawings.

Both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 1:
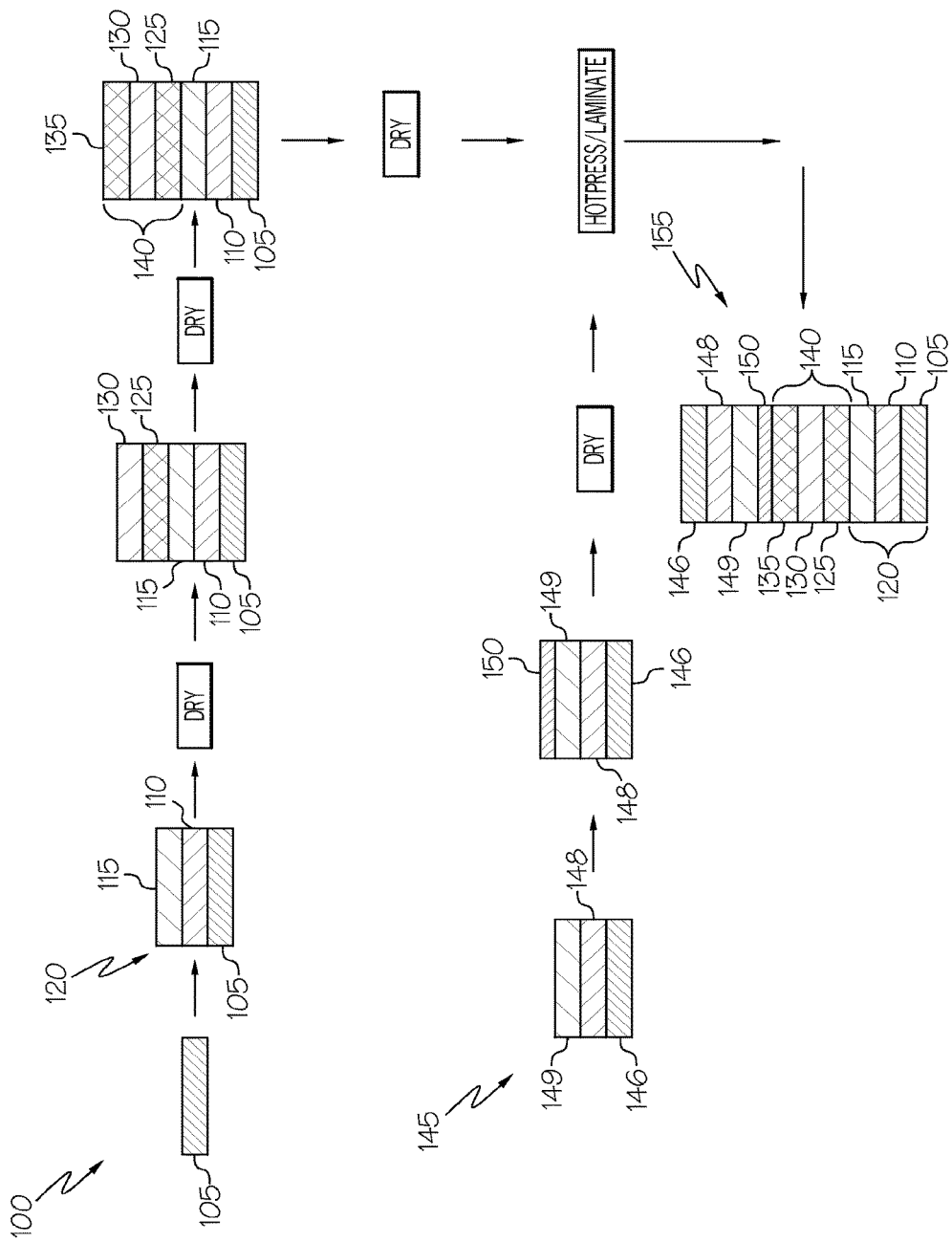
FIG. 1 schematically depicts an exemplary embodiment of a method for fabricating a membrane electrode assembly.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Reference will now be made in detail to embodiments of products and methods for fabricating reinforced membrane electrode assemblies and subassemblies, examples of which are illustrated in the accompanying drawings. Whenever possible, the same reference numerals will be used throughout the drawings to refer to the same or like parts. Described herein are methods for fabricating reinforced membrane electrode assemblies and subassemblies. Also, described herein are reinforced membrane electrode assemblies, subassemblies and fuel cells.

The methods generally include depositing an electrode ink onto a first substrate to form a first electrode layer, and applying a first porous reinforcement layer onto the first electrode layer to form a first catalyst coated substrate. The electrode ink is composed of a proton-transmissive ionomer and a catalyst, where the proton-transmissive ionomer includes an ionomer matrix with electrically conductive support particles substantially evenly distributed throughout. The method also includes depositing an ionomer solution onto the first catalyst coated substrate to form a first ionomer layer, and applying a membrane porous reinforcement layer on a surface of the first ionomer layer to form a reinforced membrane layer. The methods may further include drying the first catalyst coated substrate and/or the reinforced membrane layer. In at least some applications, the first substrate is a decal substrate, and the first electrode layer from the decal substrate is transferred to a gas diffusion layer without a microporous layer, a gas diffusion media with a microporous layer, or a free-standing microporous layer.

Disclosed methods may further include depositing a second ionomer solution onto the reinforced membrane layer to form a second ionomer layer. The first ionomer layer, the membrane porous reinforcement layer, and the second ionomer layer together form the reinforced membrane layer. Drying of the first ionomer layer along with the membrane porous reinforcement layer may be performed prior to deposition of the second ionomer solution. Drying may also be performed after deposition of all three layers. Disclosed methods may further include joining the second ionomer layer to an electrode layer of a second catalyst coated substrate to form the reinforced membrane electrode assembly. The electrode layer of the second catalyst coated substrate may or may not be reinforced. In at least some embodiments, the methods may further include forming an adhesive layer on the electrode layer of the second catalyst coated substrate, and joining the second ionomer layer to the second catalyst coated substrate such that the adhesive ionomer layer is located between and promotes adhesion between the second ionomer layer and the electrode layer of the second catalyst coated substrate. That is, the second ionomer layer is adjacent the adhesive layer. In other embodiments, the methods may include depositing a second ionomer solution onto an electrode layer of a second catalyst coated substrate to form a second ionomer layer on the second catalyst coated substrate, and joining the second ionomer layer to the reinforced membrane layer to form the reinforced membrane electrode assembly. The methods may further include joining the reinforced membrane layer to an electrode layer of a second catalyst coated substrate to form the reinforced membrane electrode assembly.

Also described and illustrated herein are various reinforced electrode assembly configurations. Disclosed assemblies may include a first catalyst coated substrate with a first electrode layer, and a first porous reinforcement layer on the first electrode layer. The first electrode layer may be formed from an electrode ink on a first substrate, where the electrode ink includes a proton-transmissive ionomer and a catalyst. The proton-transmissive ionomer includes an ionomer matrix with electrically conductive support particles substantially evenly distributed throughout. A reinforced membrane layer is positioned on the first catalyst coated substrate. The reinforced membrane layer includes a first ionomer layer on the first porous reinforcement layer, and a membrane porous reinforcement layer on the first ionomer layer.

In embodiments herein, the assemblies may further include a second catalyst coated substrate. In some embodiments, the second catalyst coated substrate may include a second electrode layer on a second substrate. In embodiments herein, the second electrode layer may or may not be reinforced using a second porous reinforcement layer. The second catalyst coated substrate may be positioned on the membrane porous reinforcement layer. In some embodiments, the second catalyst coated substrate may be positioned on the membrane porous reinforcement layer such that the membrane porous reinforcement layer is adjacent the second electrode layer. The second catalyst coated substrate may further have an optional adhesive ionomer layer formed on the second electrode layer. In embodiments herein, the second catalyst coated substrate may have an adhesive ionomer layer formed thereon, and the adhesive ionomer layer may be located between and promotes adhesion between the membrane porous reinforcement layer and the second electrode layer.

In embodiments herein, the assemblies may further include a second ionomer layer positioned on the membrane porous reinforcement layer. In some embodiments, the assemblies may further include a second catalyst coated substrate comprising a second electrode layer on a second substrate positioned on the second ionomer layer such that the second ionomer layer is adjacent the second electrode layer. In other embodiments, the second catalyst coated substrate may have an adhesive ionomer layer formed thereon, and the adhesive ionomer layer may be located between and promotes adhesion between the second ionomer layer and the second electrode layer.

Further described herein are fuel cells. In embodiments, the fuel cells may include a reinforced electrode assembly comprising a first catalyst coated substrate comprising a first electrode layer on a first substrate, and a first porous reinforcement layer on the first electrode layer, a reinforced membrane layer positioned on the first catalyst coated substrate, the reinforced membrane layer comprising a first ionomer layer and a membrane porous reinforcement layer on the first ionomer layer, and a second catalyst coated substrate positioned on the reinforced membrane layer comprising a second electrode layer on a second substrate and optionally, a second porous reinforcement layer on the second electrode layer, and a pair of plates positioned on a substrate side of the first catalyst coated substrate and the second catalyst coated substrate. In some embodiments, the second catalyst coated substrate includes a second electrode layer on a second substrate and a second porous reinforcement layer on the second electrode layer.

In some embodiments, the reinforced membrane layer may further include a second ionomer layer on the membrane porous reinforcement layer. In some embodiments, the reinforced electrode assembly may further include an adhesive ionomer layer, wherein the adhesive ionomer is located between and promotes adhesion between the reinforced membrane layer and the second electrode layer. In some embodiments, the reinforced electrode assembly may further include a second ionomer layer on the membrane porous reinforcement layer, and wherein the reinforced electrode assembly further includes an adhesive ionomer that is located between and promotes adhesion between the second ionomer layer and the second electrode layer.

The substrates described herein may include, but are not limited to, diffusion media (DM), gas diffusion media (GDM), and decal substrates, such as polymer films (e.g., polyvinylidene fluoride (PVDF), fluoroethylene propylene, polypropylene, polyimide, polyester or polytetrafluoroethylene (PTFE)), polymer-coated paper (e.g., polyurethane coated paper), silicone release paper, metal foil (e.g., aluminum foil), metallic supports (e.g., stainless steel support), a wheel with a chrome coating, or other nonporous materials. DMs and GDMs may consist of carbon-based substrates, such as carbon paper, woven carbon fabric or cloths, non-woven carbon fiber webs, which are highly porous and provide the reaction gases with good access to the electrodes. Carbon substrates that may be useful in the practice of the present disclosure may include, but are not limited to, TORAY™ Carbon Paper, SPECTRACARB™ Carbon Paper, AFN™ non-woven carbon cloth, ZOLTEK™ Carbon Cloth, ZOLTEK® PWB-3, and the like. DMs and GDMs may also be treated with a hydrophobic component or microporous layer that may permit removal of water from the fuel cell. In some embodiments, the substrate includes gas diffusion media, gas diffusion media with a microporous layer, a free-standing microporous layer, or a decal substrate. In other embodiments, the substrate includes gas diffusion media, gas diffusion media with a microporous layer, or a free-standing microporous layer.

The thickness of the substrates may vary according to, for example, type of substrate used and the application as well. In some embodiments, a porous substrate may have a thickness ranging from about 100 microns to about 500 microns. In other embodiments, a porous substrate may have a thickness ranging from about 150 microns to about 300 microns. In some embodiments, a non-porous substrate may have a thickness ranging from about 10 microns to about 3200 microns. In other embodiments, a non-porous substrate may have a thickness ranging from about 20 microns to about 40 microns.

As noted above, an electrode layer may be formed on the substrate using a catalyst-based electrode ink. The electrode ink includes a matrix of ionomer having a plurality of electrically conductive support particles substantially evenly distributed throughout. Catalyst-based electrode inks may include solvent, ionomer, and a catalyst.

Examples of suitable solvents can include, but are not limited to, isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethyl-hexan-2,5-diol, 3-hydroxy-3-methyl-2-butanone and 4-hydroxy-4-methyl-2-pentanone (diacetone alcohol) or mixtures thereof. Water may be included in the mixture, but it is not required. In some embodiments, the solvent includes organic solvents and water. In other embodiments, the solvent includes water, isopropyl alcohol, n-propyl alcohol, ethanol, or combinations thereof.

The ionomer used in catalyst inks can include any suitable proton-conducting polymer that is substantially stable under the operating conditions and temperature associated with operation of the fuel cell. Examples of suitable ionomers can include, but are not limited to, copolymers of tetrafluoroethylene and one or more fluorinated, acid-functional co-monomers, tetrafluoroethylene-fluorovinyl ether copolymer, perfluorosulfonic acids (PFSAs), sulfonated perfluorocyclobutanes (S-PFCBs), hydrocarbon polymers, sulfonated polyether ketones, aryl ketones, acid-doped polybenzimidazoles, sulfonated polysulfone, sulfonated polystyrene, or mixtures thereof. In some embodiments, the ionomer includes perfluorosulfonic acid (PFSA) polymer (for example NAFION® from the E.I. DuPont de Nemours and Co.), hydrocarbon ionomers such as sulfonated polyether ketones, aryl ketones, polybenzimidazoles, or mixtures thereof. However, it should be understood that other proton-conducting polymers may also be used.

The catalyst is typically a finely divided precious metal having catalytic activity. Suitable precious metals include, but are not limited to, platinum group metal, such as platinum, palladium, iridium, rhodium, ruthenium, or their alloys. The platinum group metal can be alloyed with other metals as well, if desired. In some embodiments, the catalyst may be coated onto support materials, including electrically conductive support particles. The support particles can be formed from any material having sufficiently high electrical conductivity and surface area to be used in a fuel cell. Suitable conductive support particles may include, but are not limited to carbon black, graphite, and activated carbon. Catalyst coated support materials are commercially available.

The electrode ink can optionally include one or more additional materials to improve the electrode properties. Additional materials may include, but are not limited to, fibers or layered silicate reinforcements, as described in U.S. application Ser. No. 12/170,706, filed Jul. 10, 2008, and U.S. application Ser. No. 12/882,653 filed Sep. 15, 2010, which are incorporated herein by reference in their respective entireties and for all purposes. Other additives, may include binders, cosolvents, wetting agents, antifoaming agents, surfactants, anti-settling agents, preservatives, pore formers, leveling agents, stabilizers, pH modifiers, milling aids and other substances that can be used in the catalyst ink composition to improve coatability or electrode properties. Furthermore, basic agents such as sodium hydroxide (NaOH) or potassium hydroxide (KOH) can be added for buffering of the acid groups of the ionomer.

The electrode ink can be deposited on any suitable substrate using conventional coating techniques, such as slot die coating. In some embodiments, if the electrode layer is formed on a decal substrate, the electrode layer can then be transferred to an appropriate layer for its intended use. For example, in a fuel cell, the electrode layer may be transferred to a proton exchange membrane or a gas diffusion media (with or without a microporous layer).

In embodiments herein, the porous reinforcement layers may include, but are not limited to, a polymer film, a metal screen, a woven fabric, or combinations thereof. Examples of suitable polymer films may include polytetrafluoroethylene (PTFE), expanded polytetrafluoroethylene (ePTFE), polyvinylidene fluoride (PVDF), or fluoroethylene propylene (PEP). In some embodiments, the first, membrane and/or second porous reinforcement layers includes expanded polytetrafluoroethylene.

In embodiments herein, the porous reinforcement layers may be pretreated with a surfactant solution, such as a dilute ionomer solution, and dried. Without being bound by theory, it has been found that when ionomer solutions containing sulfonated perfluorocyclobutanes and/or perfluorosulfonic acid ionomers are used to form membrane layers, as further described below, the ePTFE may not fully wet with the ionomer solution from the membrane layer and fill the ePTFE so that it can be effectively applied to a membrane layer. Also, the ePTFE may not fully wet with the electrode ink used to form the electrode layers. It is believed that by pretreating the porous reinforcement layer with the surfactant solution, the surfactant solution may act to lower the surface tension of the ionomer used to form the membrane layer, or the electrode ink used to form the electrode layers, so that the ePTFE can become completely imbibed and/or wet during application.

Pretreatment occurs prior to applying the porous reinforcement layer to an ionomer layer or electrode layer. Pretreatment can include, but it not limited to spraying the porous reinforcement layers with the surfactant solution, dipping the porous reinforcement layers into the surfactant solution, knife coating, rod coating, slot die coating and/or other traditional dipping or coating methods known by those skilled in the art. In embodiments herein, suitable surfactant solutions may include from about 0.1 to about 5 wt. %, from about 0.2 to about 2 wt. %, or from about 0.5 to about 1 wt. % of an ionomer, e.g., sulfonated perfluorocyclobutanes, perfluorosulfonic acid ionomers (e.g., D2020 available from E. I. DuPont de Nemours and Company (Wilmington, Del., US)), and/or mixtures thereof, in a solvent solution. The solvent may include isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol) or mixtures thereof.

In some embodiments, the membrane porous reinforcement layer is pretreated with a surfactant solution comprising from about 0.2 to about 2 wt. % sulfonated perfluorocyclobutanes, perfluorosulfonic acid ionomers, or mixtures thereof, in a solvent, and dried. In other embodiments, one or both of the first and second porous reinforcement layers are pretreated with a surfactant solution comprising from about 0.2 to about 2 wt. % sulfonated perfluorocyclobutanes, perfluorosulfonic acid ionomers, or mixtures thereof, in a solvent, and dried.

The ionomer used in forming membrane layers may include any suitable polymer electrolyte. Examples of polymer electrolytes useful in the present disclosure may include highly fluorinated and, in some examples, perfluorinated, but may also be partially fluorinated or non-fluorinated. Examples of fluorinated polymer electrolytes useful in the present disclosure can include copolymers of tetrafluoroethylene and one or more fluorinated, acid-functional co-monomers, tetrafluoroethylene-fluorovinyl ether copolymer, perfluorosulfonic acids (PFSAs), sulfonated perfluorocyclobutanes (S-PFCBs), or mixtures thereof. The ionomer materials are used in a liquid composition, i.e. dissolved or dispersed in a suitable solvent. Many fluorine-containing ionomer materials can be obtained in the form of an aqueous solution in various concentrations. The ionomer content of the solutions may range from about 5% to about 50% by weight of the solution. Of course, ionomer materials supplied in the form of aqueous dispersions may also be used. Such dispersions may include, for example, NAFION® PFSA polymer dispersions sold by DuPont. Examples of fluorine-free, ionomer materials that may be used can include hydrocarbon polymers, sulfonated polyether ketones, sulfonated aryl ketones, acid-doped polybenzimidazoles, sulfonated polysulfone, and sulfonated polystyrene.

The membranes formed by the processes described herein may have a dry thickness ranging from about 1 μm to about 50 μm. In some embodiments, the membrane layer may have a dry thickness ranging from about 1 μm to about 30 μm. In other embodiments, the membrane layer may have a dry thickness ranging from about 1 μm to about 15 μm.

Referring to FIG. 1, an exemplary method (100) of fabricating a reinforced membrane electrode assembly is depicted. On the surface of a first substrate (105), an electrode ink is deposited onto the first substrate (105) to form a first electrode layer (110). A first porous reinforcement layer (115) is applied to the surface of the first electrode layer (110) while wet to form a first catalyst coated substrate (120). In some examples, the first porous reinforcement layer (115) may be imbibed or impregnated with the first electrode layer (110) while wet. The first catalyst coated substrate (120) is dried. A first ionomer solution is deposited onto the first catalyst coated substrate (120) to form a first ionomer layer (125). A membrane porous reinforcement layer (130) is applied to the surface of the first ionomer layer (125) while wet. In some examples, the membrane porous reinforcement layer (130) may be imbibed or impregnated with the first ionomer layer (125) while wet. The membrane porous reinforcement layer (130) and the first ionomer layer (125) are dried. A second ionomer solution is deposited onto the membrane porous reinforcement layer (130) to form a second ionomer layer (135). The second ionomer layer (135) is dried. The first ionomer layer (125), membrane porous reinforcement layer (130), and the second ionomer layer (135) form a reinforced membrane layer (140).

A second catalyst coated substrate (145) is formed having an optional adhesive ionomer layer (150) on the surface of the second catalyst coated substrate (145). The second catalyst coated substrate (145) may include a second electrode layer (148) on a second substrate (146). The second electrode layer (148) may or may not be reinforced using a second porous reinforcement layer (149). A third ionomer solution is deposited onto the second catalyst coated substrate (145) to form the optional adhesive ionomer layer (150). The optional adhesive ionomer layer (150) is dried. The optional adhesive ionomer layer (150) may be used to promote adhesion between the second ionomer layer (135) and the second catalyst coated substrate (145). In some embodiments, the optional adhesive ionomer layer (150) may be used to promote adhesion between the second ionomer layer (135) and the second electrode layer of the second catalyst coated substrate (145). The first catalyst coated substrate (120) having the reinforced membrane layer (140) formed thereon and the second catalyst coated substrate (145) having the optional adhesive ionomer layer (150) formed thereon are hot pressed or laminated together to form a reinforced membrane electrode assembly (155).

The reinforced membrane electrode assembly (155) shown in FIG. 1 has a first electrode layer (110) on a first substrate (105), a first porous reinforcement layer (115) on the first electrode layer (110). The first substrate (105), first electrode layer (110) and first porous reinforcement layer (115) together form the first catalyst coated substrate (120). A first ionomer layer (125) on the first porous reinforcement layer (115), and a membrane porous reinforcement layer (130) is on the first ionomer layer (125). A second ionomer layer (135) is on the membrane porous reinforcement layer (130). The first ionomer layer (125), membrane porous reinforcement layer (130), and the second ionomer layer (135) together form the reinforced membrane layer (140). An optional adhesive ionomer layer (150) is on the second ionomer layer (135), and a second catalyst coated substrate (145) is on the optional adhesive ionomer layer (150).

Figure 2:
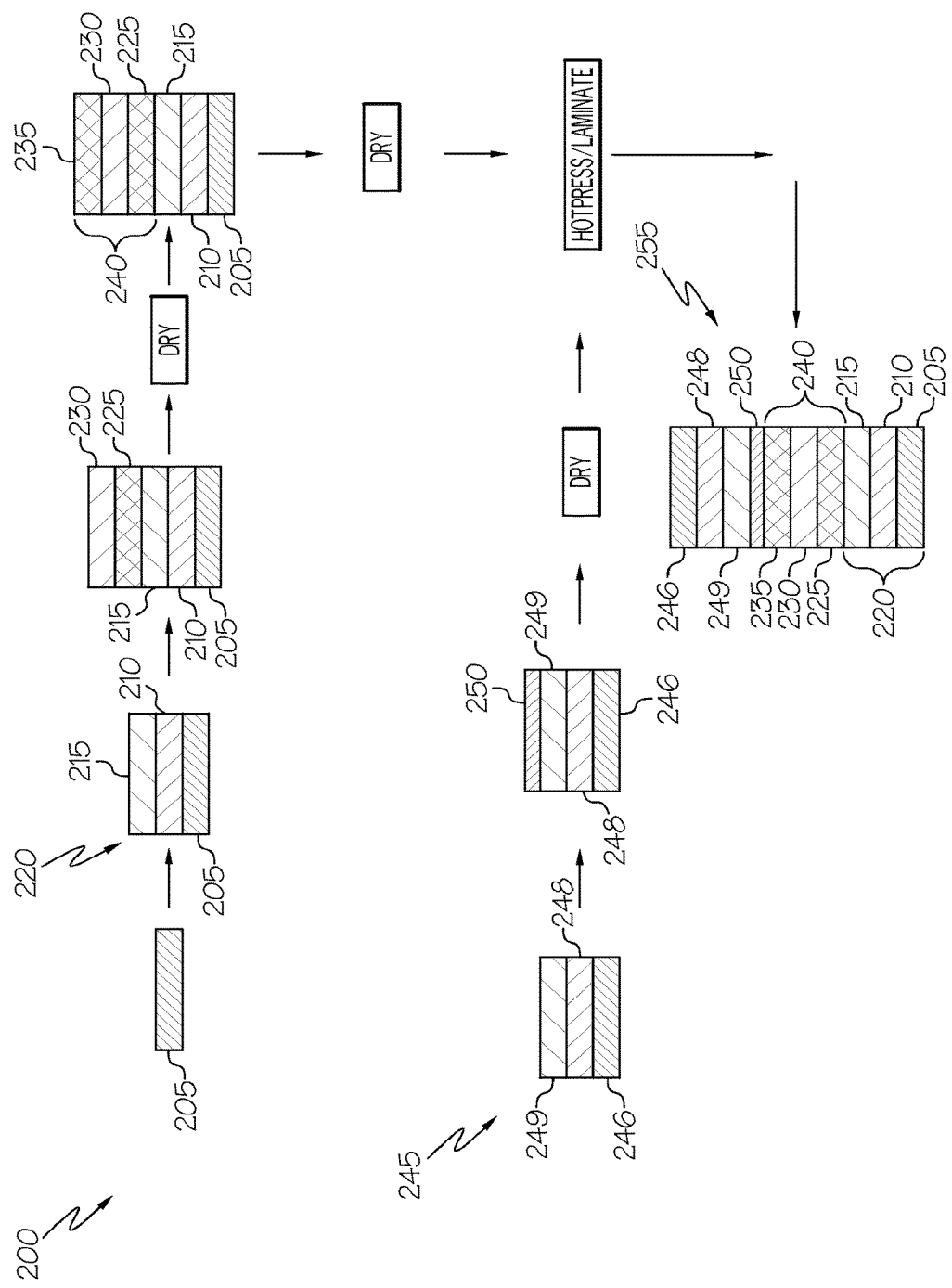
FIG. 2 schematically depicts another exemplary embodiment of a method for fabricating a membrane electrode assembly.

Referring to FIG. 2, an exemplary method (200) of fabricating a reinforced membrane electrode assembly is depicted. On the surface of a first substrate (205), an electrode ink is deposited onto the first substrate (205) to form a first electrode layer (210). A first porous reinforcement layer (215) is applied to the surface of the first electrode layer (210) while wet to form a first catalyst coated substrate (220). In some examples, the first porous reinforcement layer (215) may be imbibed or impregnated with the first electrode layer (210) while wet. An ionomer solution is deposited onto the first catalyst coated substrate (220) to form a first ionomer layer (225). A membrane porous reinforcement layer (230) is applied to the surface of the first ionomer layer (225) while wet. In some examples, the membrane porous reinforcement layer (230) may be imbibed or impregnated with the first ionomer layer (225) while wet. The first catalyst coated substrate (220), the first ionomer layer (225), and the membrane porous reinforcement layer (230) are dried. A second ionomer solution is deposited onto the membrane porous reinforcement layer (230) to form a second ionomer layer (235). The second ionomer layer (235) is dried. The first ionomer layer (225), membrane porous reinforcement layer (230), and the second ionomer layer (235) form a reinforced membrane layer (240).

A second catalyst coated substrate (245) is formed having an optional adhesive ionomer layer (250) on the surface of the second catalyst coated substrate (245). The second catalyst coated substrate (245) may include a second electrode layer (248) on a second substrate (246). The second electrode layer (248) may or may not be reinforced using a second porous reinforcement layer (249). A third ionomer solution is deposited onto the second catalyst coated substrate (245) to form the optional adhesive ionomer layer (250). The optional adhesive ionomer layer (250) is dried. The optional adhesive ionomer layer (250) may be used to promote adhesion between the second ionomer layer (235) and the second catalyst coated substrate (245). In some embodiments, the optional adhesive ionomer layer (250) may be used to promote adhesion between the second ionomer layer (235) and the second electrode layer of the catalyst coated substrate (245). The first catalyst coated substrate (220) having the reinforced membrane layer (240) formed thereon and the second catalyst coated substrate (245) having the optional adhesive ionomer layer (250) formed thereon are hot pressed or laminated together to form a reinforced membrane electrode assembly (255).

The reinforced membrane electrode assembly (255) shown in FIG. 2 has a first electrode layer (210) on a first substrate (205), a first porous reinforcement layer (215) on the first electrode layer (210). The first substrate (205), first electrode layer (210) and first porous reinforcement layer (215) together form the first catalyst coated substrate (220). A first ionomer layer (225) is on the first porous reinforcement layer (215), and a membrane porous reinforcement layer (230) is on the first ionomer layer (225). A second ionomer layer (235) is on the membrane porous reinforcement layer (230). The first ionomer layer (225), membrane porous reinforcement layer (230), and the second ionomer layer (235) together form the reinforced membrane layer (240). An optional adhesive ionomer layer (250) is on the second ionomer layer (235), and a second catalyst coated substrate (245) is on the optional adhesive ionomer layer (250).

Figure 3:
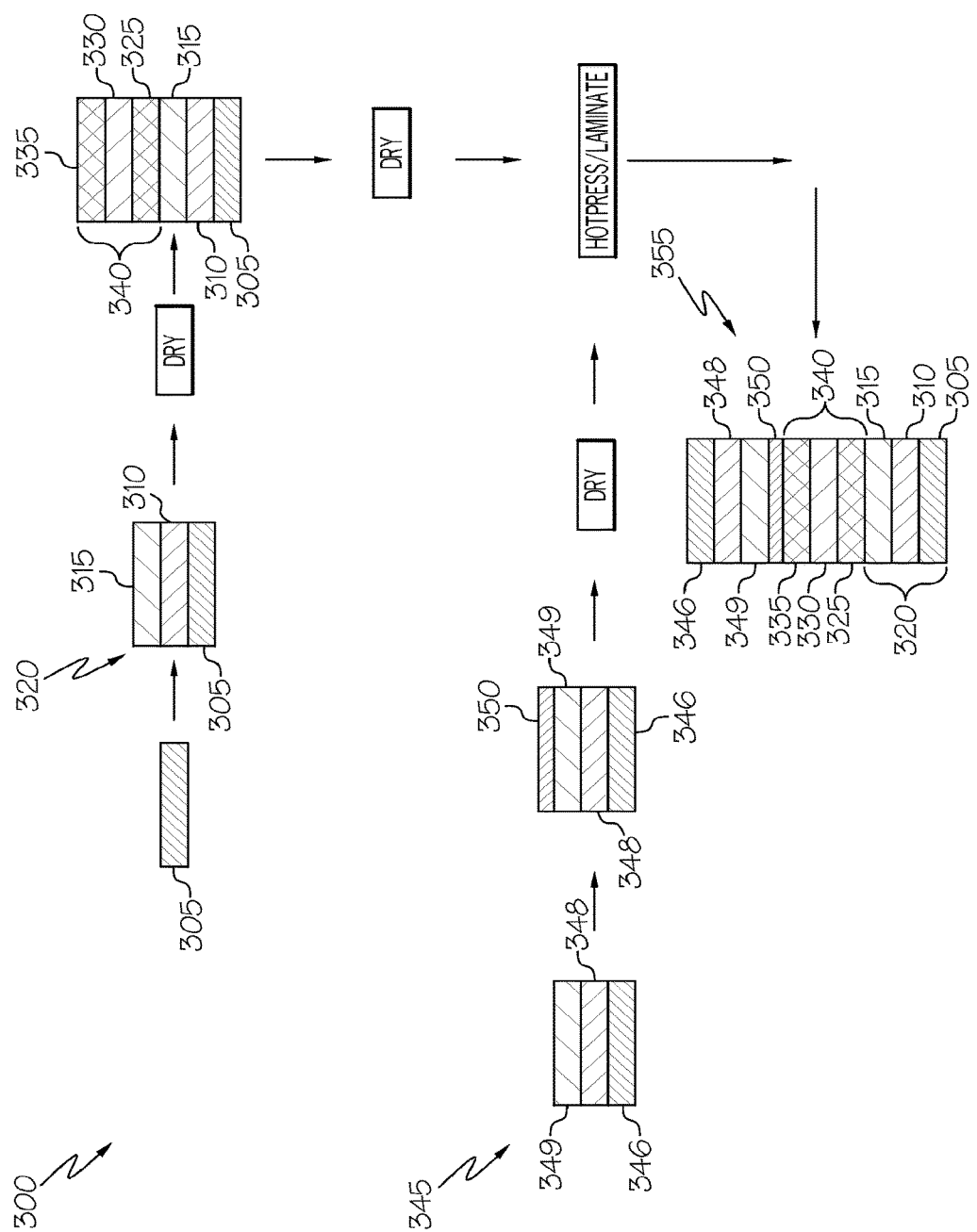
FIG. 3 schematically depicts a further exemplary embodiment of a method for fabricating a membrane electrode assembly.

Referring to FIG. 3, an exemplary method (300) of fabricating a reinforced membrane electrode assembly is depicted. On the surface of a first substrate (305), an electrode ink is deposited onto the first substrate (305) to form a first electrode layer (310). A first porous reinforcement layer (315) is applied to the surface of the first electrode layer (310) while wet to form a first catalyst coated substrate (320). In some examples, the first porous reinforcement layer (315) may be imbibed or impregnated with the first electrode layer (310) while wet. The first catalyst coated substrate (320) is dried. An ionomer solution is deposited onto the first catalyst coated substrate (320) to form a first ionomer layer (325). A membrane porous reinforcement layer (330) is applied to the surface of the first ionomer layer (325) while wet. In some examples, the membrane porous reinforcement layer (330) may be imbibed or impregnated with the first ionomer layer (325) while wet. A second ionomer solution is deposited onto the membrane porous reinforcement layer (330) to form a second ionomer layer (335). The first ionomer layer (325), the membrane porous reinforcement layer (330), and the second ionomer layer (335) form a reinforced membrane layer (340), and the reinforced membrane layer (340) is dried.

A second catalyst coated substrate (345) is formed having an optional adhesive ionomer layer (350) on the surface of the second catalyst coated substrate (345). The second catalyst coated substrate (345) may include a second electrode layer (348) on a second substrate (346). The second electrode layer may or may not be reinforced using a second porous reinforcement layer (349). A third ionomer solution is deposited onto the second catalyst coated substrate (345) to form the optional adhesive ionomer layer (350). The optional adhesive ionomer layer (350) is dried. In some embodiments, the optional adhesive ionomer layer (350) may be used to promote adhesion between the second ionomer layer (335) and the second electrode layer of the catalyst coated substrate (345). The first catalyst coated substrate (320) having the reinforced membrane layer (340) formed thereon and the second catalyst coated substrate (345) having the optional adhesive ionomer layer (350) formed thereon are hot pressed or laminated together to form a reinforced membrane electrode assembly (355).

The reinforced membrane electrode assembly (355) shown in FIG. 3 has a first electrode layer (310) on a first substrate (305), a first porous reinforcement layer (315) on the first electrode layer (310). The first substrate (305), first electrode layer (310) and first porous reinforcement layer (315) together form the first catalyst coated substrate (320). A first ionomer layer (325) is on the first porous reinforcement layer (315), and a membrane porous reinforcement layer (330) is on the first ionomer layer (325). A second ionomer layer (335) is on the membrane porous reinforcement layer (330). The first ionomer layer (325), membrane porous reinforcement layer (330), and the second ionomer layer (335) together form the reinforced membrane layer (340). An optional adhesive ionomer layer (350) is on the second ionomer layer (335), and a second catalyst coated substrate (345) is on the optional adhesive ionomer layer (350).

Figure 4:
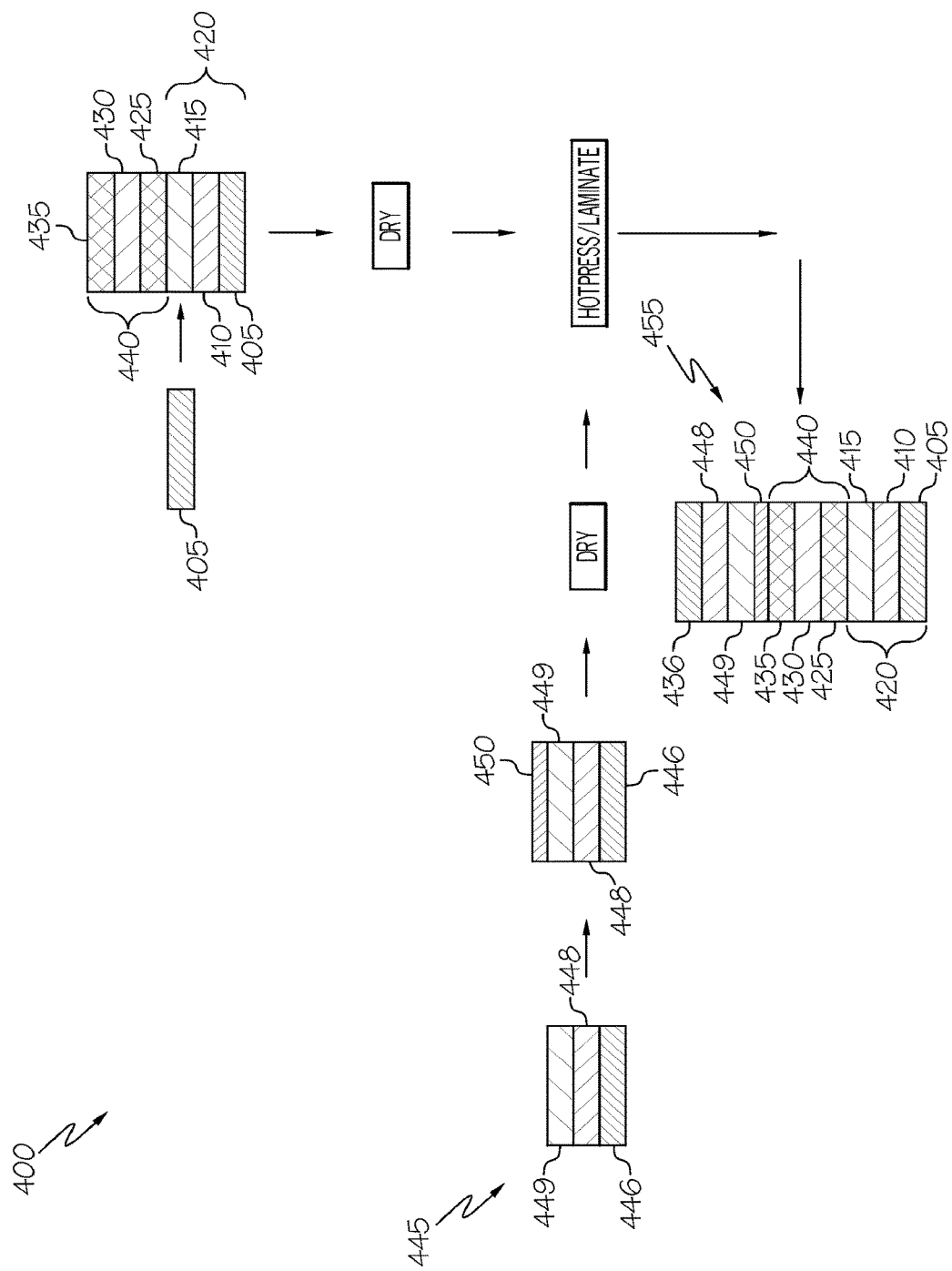
FIG. 4 schematically depicts an even further exemplary embodiment of a method for fabricating a membrane electrode assembly.

Referring to FIG. 4, an exemplary method (400) of fabricating a reinforced membrane electrode assembly is depicted. On the surface of a first substrate (405), an electrode ink is deposited onto the first substrate (405) to form a first electrode layer (410). A first porous reinforcement layer (415) is applied to the surface of the first electrode layer (410) while wet to form a first catalyst coated substrate (420). In some examples, the first porous reinforcement layer (415) may be imbibed or impregnated with the first electrode layer (410) while wet. An ionomer solution is deposited onto the first catalyst coated substrate (420) to form a first ionomer layer (425). A membrane porous reinforcement layer (430) is applied to the surface of the first ionomer layer (425) while wet. In some examples, the membrane porous reinforcement layer (430) may be imbibed or impregnated with the first ionomer layer (425) while wet. A second ionomer solution is deposited onto the membrane porous reinforcement layer (430) to form a second ionomer layer (435). The first ionomer layer (425), the membrane porous reinforcement layer (430), and the second ionomer layer (435) form a reinforced membrane layer (440). The first catalyst coated substrate (420) and the reinforced membrane layer (440) are dried in one step.

A second catalyst coated substrate (445) is formed having an optional adhesive ionomer layer (450) on the surface of the second catalyst coated substrate (445). The second catalyst coated substrate (445) may include a second electrode layer (448) on a second substrate (446). The second electrode layer (448) may or may not be reinforced using a second porous reinforcement layer (449). A third ionomer solution is deposited onto the second catalyst coated substrate (445) to form the optional adhesive ionomer layer (450). The optional adhesive ionomer layer (450) is dried. The optional adhesive ionomer layer (450) may be used to promote adhesion between the second ionomer layer (435) and the second catalyst coated substrate (445). In some embodiments, the optional adhesive ionomer layer (450) may be used to promote adhesion between the second ionomer layer (435) and the second electrode layer of the second catalyst coated substrate (445). The first catalyst coated substrate (420) having the reinforced membrane layer (440) formed thereon and the second catalyst coated substrate (445) having the optional adhesive ionomer layer (450) formed thereon are hot pressed or laminated together to form a reinforced membrane electrode assembly (455).

The reinforced membrane electrode assembly (455) shown in FIG. 4 has a first electrode layer (410) on a first substrate (405), a first porous reinforcement layer (415) on the first electrode layer (410). The first substrate (405), first electrode layer (410) and first porous reinforcement layer (415) together form the first catalyst coated substrate (420). A first ionomer layer (425) is on the first porous reinforcement layer (415), and a membrane porous reinforcement layer (430) is on the first ionomer layer (425). A second ionomer layer (435) is on the membrane porous reinforcement layer (430). The first ionomer layer (425), membrane porous reinforcement layer (430), and the second ionomer layer (435) together form the reinforced membrane layer (440). An optional adhesive ionomer layer (450) is on the second ionomer layer (435), and a second catalyst coated substrate (445) is on the optional adhesive ionomer layer (450).

Figure 5:
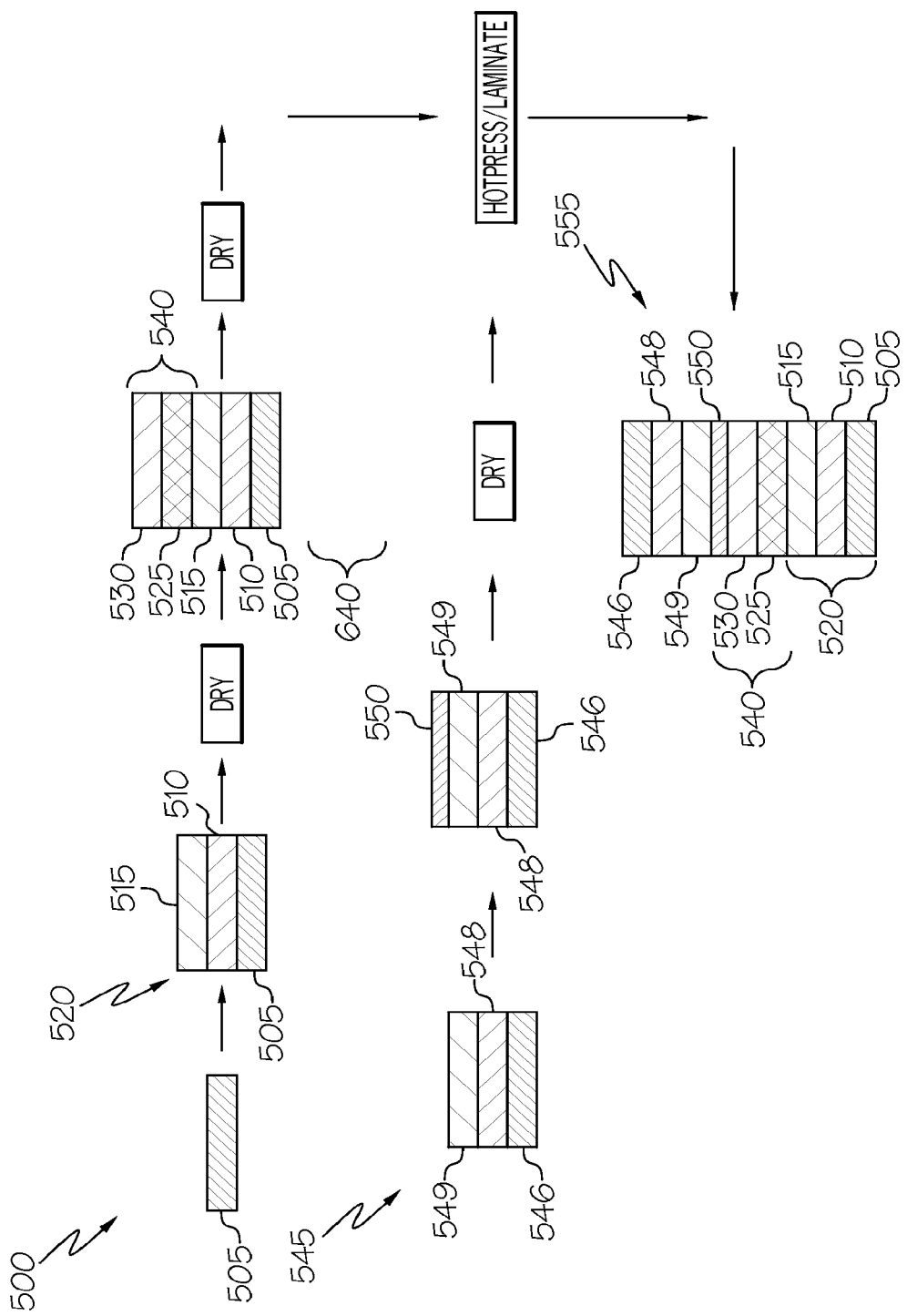
FIG. 5 schematically depicts an even further exemplary embodiment of a method for fabricating a membrane electrode assembly.

Referring to FIG. 5, an exemplary method (500) of fabricating a reinforced membrane electrode assembly is depicted. On the surface of a first substrate (505), an electrode ink is deposited onto the first substrate (505) to form a first electrode layer (510). A first porous reinforcement layer (515) is applied to the surface of the first electrode layer (510) while wet to form a first catalyst coated substrate (520). In some examples, the first porous reinforcement layer (515) may be imbibed or impregnated with the first electrode layer (510) while wet. The first catalyst coated substrate (520) is dried. An ionomer solution is deposited onto the first catalyst coated substrate (520) to form a first ionomer layer (525). A membrane porous reinforcement layer (530) is applied to the surface of the first ionomer layer (525) while wet. In some examples, the membrane porous reinforcement layer (530) may be imbibed or impregnated with the first ionomer layer (525) while wet. The membrane porous reinforcement layer (530) and the first ionomer layer (525) are dried. The first ionomer layer (525) and the membrane porous reinforcement layer (530) form a reinforced membrane layer (540).

A second catalyst coated substrate (545) is formed having an optional adhesive ionomer layer (550) on the surface of the second catalyst coated substrate (545). The second catalyst coated substrate (545) may include a second electrode layer (548) on a second substrate (546). The second electrode layer (548) may or may not be reinforced using a second porous reinforcement layer (549). A second ionomer solution is deposited onto the second catalyst coated substrate (545) to form the optional adhesive ionomer layer (550). The optional adhesive ionomer layer (550) is dried. The optional adhesive ionomer layer (550) may be used to promote adhesion between the membrane porous reinforcement layer (530) and the second catalyst coated substrate (545). In some embodiments, the optional adhesive ionomer layer (550) may be used to promote adhesion between the membrane porous reinforcement layer (530) and the second electrode layer of the second catalyst coated substrate (545). The first catalyst coated substrate (520) having the reinforced membrane layer (540) formed thereon and the second catalyst coated substrate (545) having the optional adhesive ionomer layer (550) formed thereon are hot pressed or laminated together to form a reinforced membrane electrode assembly (555).

The reinforced membrane electrode assembly (555) shown in FIG. 5 has a first electrode layer (510) on a first substrate (505), a first porous reinforcement layer (515) on the first electrode layer (510). The first substrate (505), first electrode layer (510) and first porous reinforcement layer (515) together form the first catalyst coated substrate (520). A first ionomer layer (525) on the first porous reinforcement layer (515), and a membrane porous reinforcement layer (530) is on the first ionomer layer (525). The first ionomer layer (525) and the membrane porous reinforcement layer (530) together form the reinforced membrane layer (540). An optional adhesive ionomer layer (550) is on the membrane porous reinforcement layer (530) of the reinforced membrane layer (540), and a second catalyst coated substrate (545) is on the optional adhesive ionomer layer (550).

Figure 6:
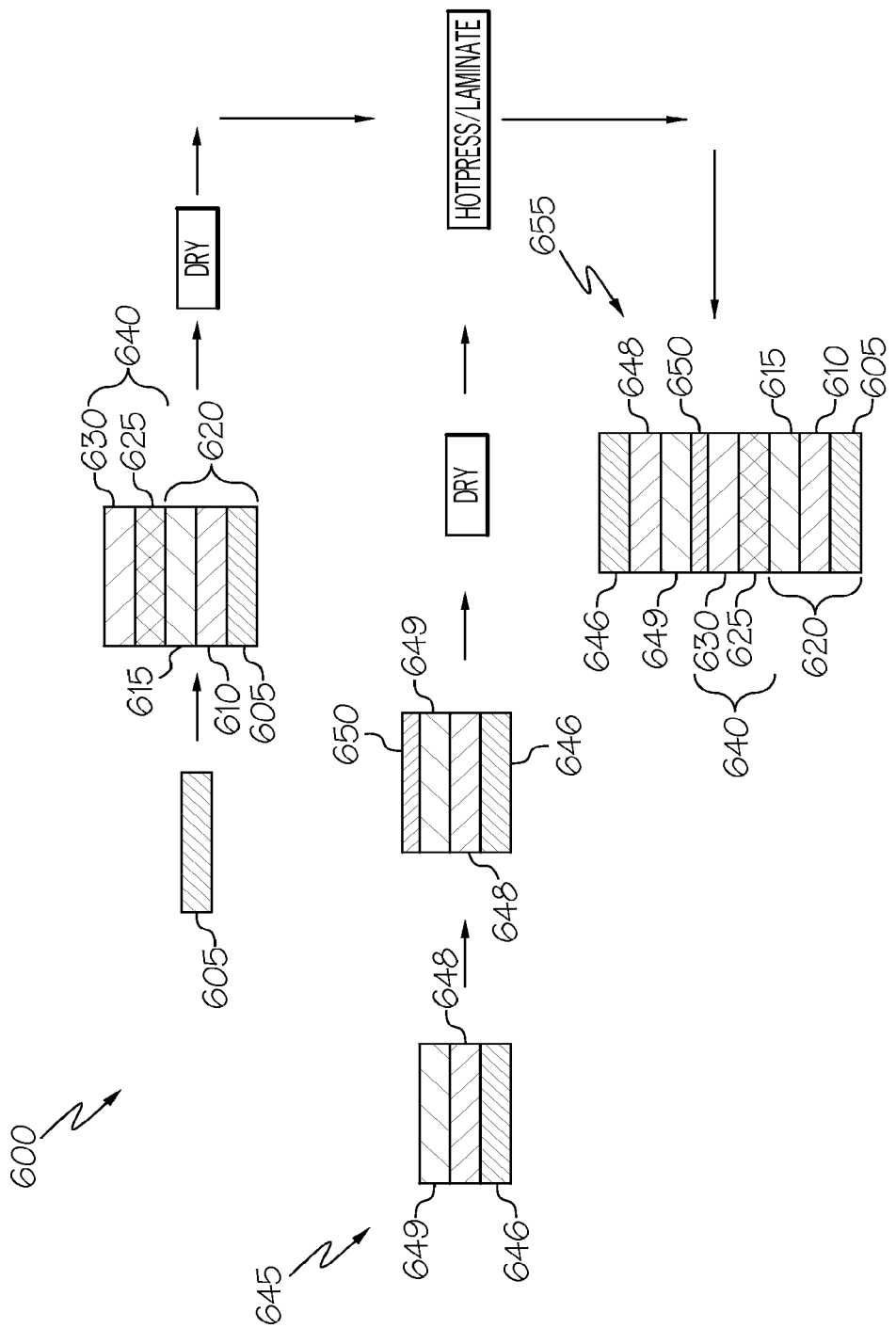
FIG. 6 schematically depicts an even further exemplary embodiment of a method for fabricating a membrane electrode assembly.

Referring to FIG. 6, an exemplary method (600) of fabricating a reinforced membrane electrode assembly is depicted. On the surface of a first substrate (605), an electrode ink is deposited onto the first substrate (605) to form a first electrode layer (610). A first porous reinforcement layer (615) is applied to the surface of the first electrode layer (610) while wet to form a first catalyst coated substrate (620). In some examples, the first porous reinforcement layer (615) may be imbibed or impregnated with the first electrode layer (610) while wet. An ionomer solution is deposited onto the first catalyst coated substrate (620) to form a first ionomer layer (625). A membrane porous reinforcement layer (630) is applied to the surface of the first ionomer layer (625) while wet. In some examples, the membrane porous reinforcement layer (630) may be imbibed or impregnated with the first ionomer layer (625) while wet. The first catalyst coated substrate (620), the first ionomer layer (625), and the membrane porous reinforcement layer (630) are dried. The first ionomer layer (625) and the membrane porous reinforcement layer (630) form a reinforced membrane layer (640).

A second catalyst coated substrate (645) is formed having an optional adhesive ionomer layer (650) on the surface of the second catalyst coated substrate (645). The second catalyst coated substrate (645) may include a second electrode layer (648) on a second substrate (646). The second electrode layer (648) may or may not be reinforced using a second porous reinforcement layer (649). A second ionomer solution is deposited onto the second catalyst coated substrate (645) to form the optional adhesive ionomer layer (650). The optional adhesive ionomer layer (650) is dried. The optional adhesive ionomer layer (650) may be used to promote adhesion between the membrane porous reinforcement layer (630) and the second catalyst coated substrate (645). In some embodiments, the optional adhesive ionomer layer (650) may be used to promote adhesion between the membrane porous reinforcement layer (630) and the second electrode layer of the second catalyst coated substrate (645). The first catalyst coated substrate (620) having the reinforced membrane layer (640) formed thereon and the second catalyst coated substrate (645) having the optional adhesive ionomer layer (150) formed thereon are hot pressed or laminated together to form a reinforced membrane electrode assembly (655).

The reinforced membrane electrode assembly (655) shown in FIG. 6 has a first electrode layer (610) on a first substrate (605), a first porous reinforcement layer (615) on the first electrode layer (610). The first substrate (605), first electrode layer (610) and first porous reinforcement layer (615) together form the first catalyst coated substrate (620). A first ionomer layer (625) is on the first porous reinforcement layer (615), and a membrane porous reinforcement layer (630) is on the first ionomer layer (625). The first ionomer layer (625) and the membrane porous reinforcement layer (630) together form the reinforced membrane layer (640). An optional adhesive ionomer layer (650) is on the membrane porous reinforcement layer (630), and a second catalyst coated substrate (645) is on the optional adhesive ionomer layer (650).

Figure 7:
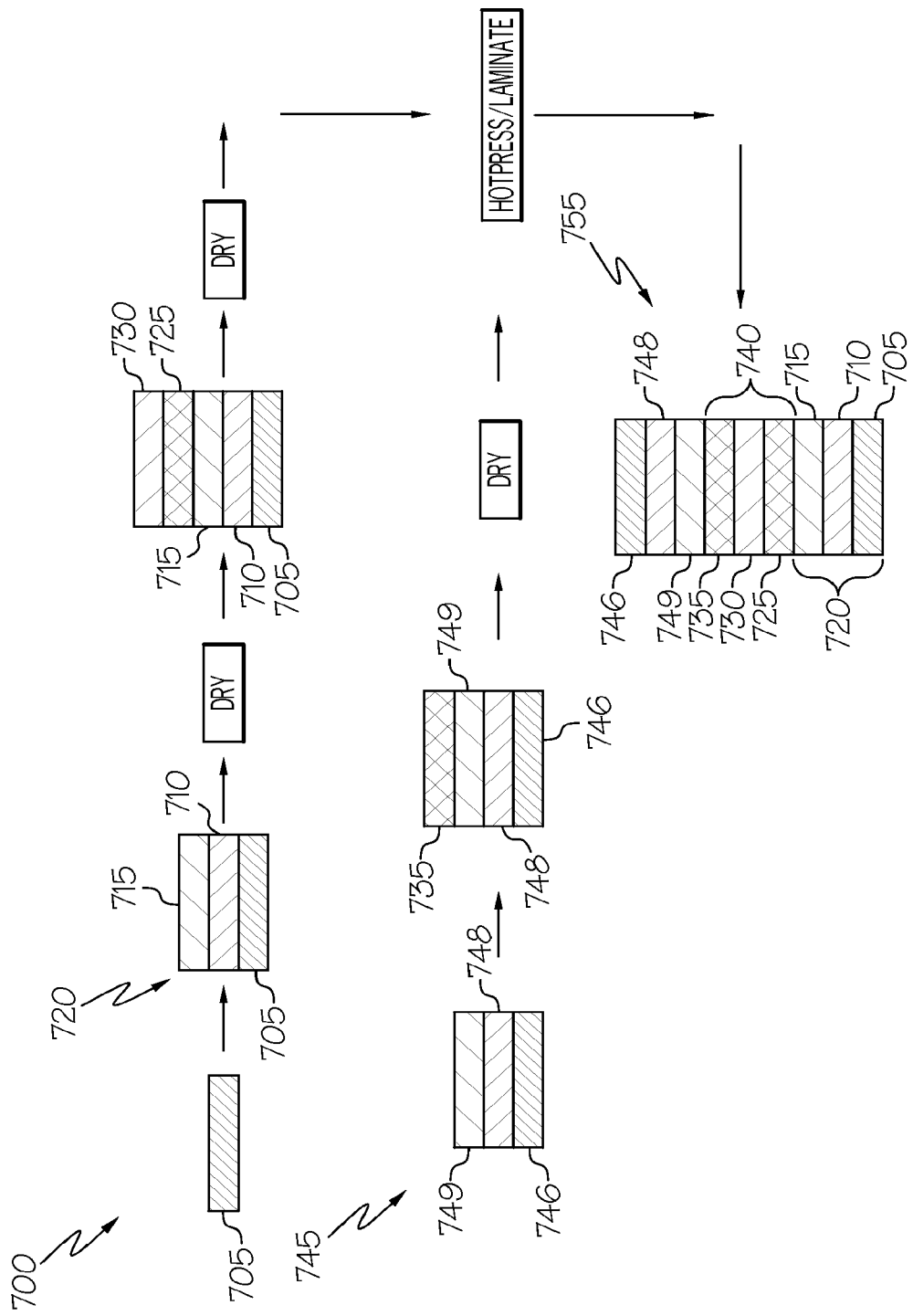
FIG. 7 schematically depicts an even further exemplary embodiment of a method for fabricating a membrane electrode assembly.

Referring to FIG. 7, an exemplary method (700) of fabricating a reinforced membrane electrode assembly is depicted. On the surface of a first substrate (705), an electrode ink is deposited onto the first substrate (705) to form a first electrode layer (710). A first porous reinforcement layer (715) is applied to the surface of the first electrode layer (710) while wet to form a first catalyst coated substrate (720). In some examples, the first porous reinforcement layer (715) may be imbibed or impregnated with the first electrode layer (710) while wet. The first catalyst coated substrate (720) is dried. An ionomer solution is deposited onto the first catalyst coated substrate (720) to form a first ionomer layer (725). A membrane porous reinforcement layer (730) is applied to the surface of the first ionomer layer (725) while wet. In some examples, the membrane porous reinforcement layer (730) may be imbibed or impregnated with the first ionomer layer (725) while wet. The first ionomer layer (725) and the membrane porous reinforcement layer (730) are dried.

A second catalyst coated substrate (745) is provided. The second catalyst coated substrate (745) may include a second electrode layer (748) on a second substrate (746). The second electrode layer (748) may or may not be reinforced using a second porous reinforcement layer (749). A second ionomer solution is deposited onto the second catalyst coated substrate (745) to form a second ionomer layer (735). The second ionomer layer (735) is dried. The first catalyst coated substrate (720) having the first ionomer layer (725) and the membrane porous reinforcement layer (730) formed thereon and the second catalyst coated substrate (745) having the second ionomer layer (735) formed thereon are hot pressed or laminated together to form a reinforced membrane electrode assembly (755).

The reinforced membrane electrode assembly (755) shown in FIG. 7 has a first electrode layer (710) on a first substrate (705), a first porous reinforcement layer (715) on the first electrode layer (710). The first substrate (705), first electrode layer (710) and first porous reinforcement layer (715) together form the first catalyst coated substrate (720). A first ionomer layer (725) is on the first porous reinforcement layer (715), and a membrane porous reinforcement layer (730) is on the first ionomer layer (725). A second ionomer layer (735) is on the membrane porous reinforcement layer (730). The first ionomer layer (725), membrane porous reinforcement layer (730), and the second ionomer layer (735) together form the reinforced membrane layer (740). A second catalyst coated substrate (745) is on the second ionomer layer (735).

Figure 8:
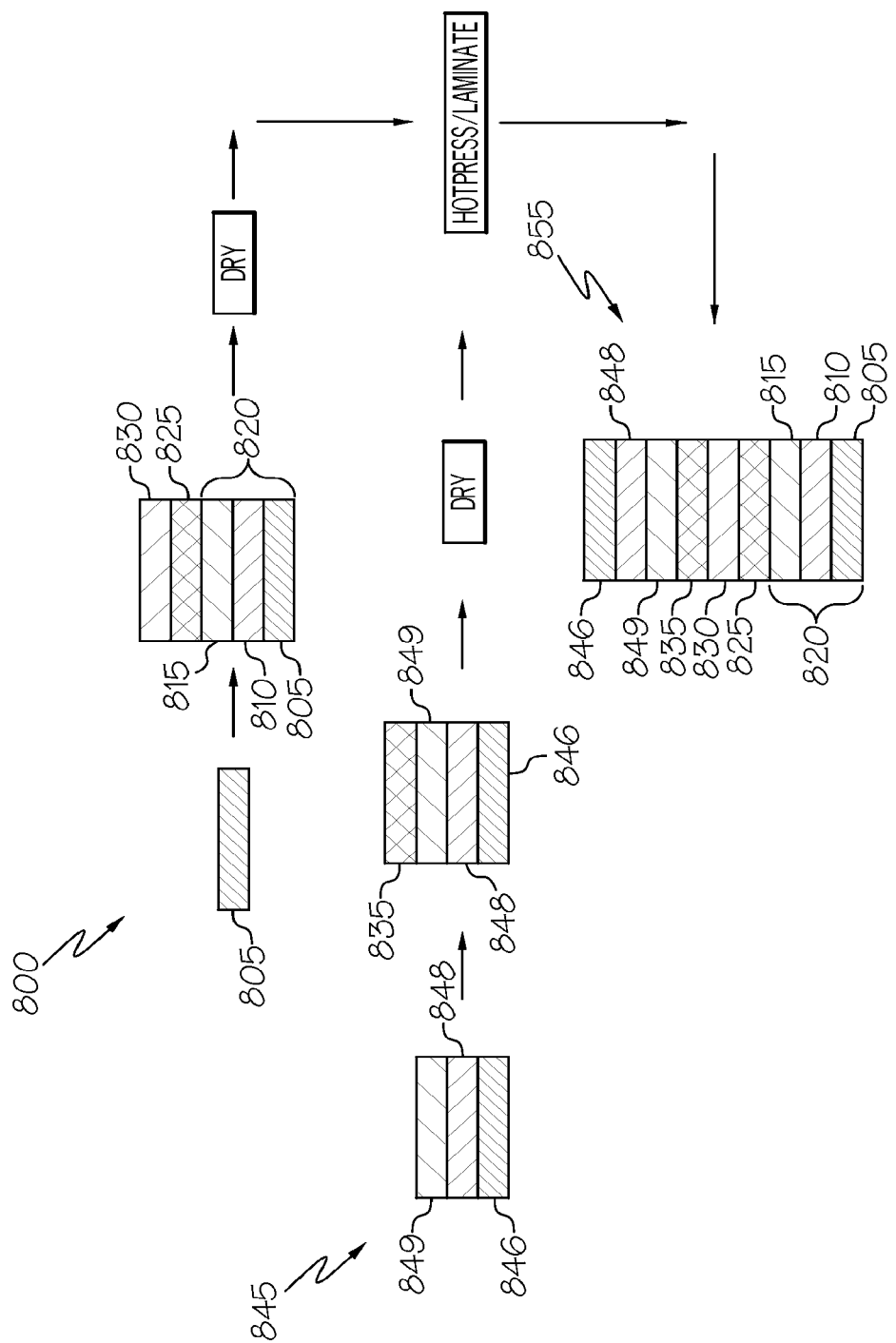
FIG. 8 schematically depicts an even further exemplary embodiment of a method for fabricating a membrane electrode assembly.

Referring to FIG. 8, an exemplary method (800) of fabricating a reinforced membrane electrode assembly is depicted. On the surface of a first substrate (805), an electrode ink is deposited onto the first substrate (805) to form a first electrode layer (810). A first porous reinforcement layer (815) is applied to the surface of the first electrode layer (810) while wet to form a first catalyst coated substrate (820). In some examples, the first porous reinforcement layer (815) may be imbibed or impregnated with the first electrode layer (810) while wet. An ionomer solution is deposited onto the first catalyst coated substrate (820) to form a first ionomer layer (825). A membrane porous reinforcement layer (830) is applied to the surface of the first ionomer layer (825) while wet. In some examples, the membrane porous reinforcement layer (830) may be imbibed or impregnated with the first ionomer layer (825) while wet. The first catalyst coated substrate (820), first ionomer layer (825) and the membrane porous reinforcement layer (830) are dried.

A second catalyst coated substrate (845) is provided. The second catalyst coated substrate (845) may include a second electrode layer (848) on a second substrate (846). The second electrode layer (848) may or may not be reinforced using a second porous reinforcement layer (849). A second ionomer solution is deposited onto the second catalyst coated substrate (845) to form a second ionomer layer (835). The second ionomer layer (835) is dried. The first catalyst coated substrate (820) having the first ionomer layer (825) and the membrane porous reinforcement layer (830) formed thereon and the second catalyst coated substrate (845) having the second ionomer layer (835) formed thereon are hot pressed or laminated together to form a reinforced membrane electrode assembly (855).

The reinforced membrane electrode assembly (855) shown in FIG. 8 has a first electrode layer (810) on a first substrate (805), a first porous reinforcement layer (815) on the first electrode layer (810). The first substrate (805), first electrode layer (810) and first porous reinforcement layer (815) together form the first catalyst coated substrate (820). A first ionomer layer (825) is on the first porous reinforcement layer (815), and a membrane porous reinforcement layer (830) is on the first ionomer layer (825). A second ionomer layer (835) is on the membrane porous reinforcement layer (830). The first ionomer layer (825), membrane porous reinforcement layer (830), and the second ionomer layer (835) together form the reinforced membrane layer (840). A second catalyst coated substrate (845) is on the second ionomer layer (835).

The embodiments described herein may be further illustrated by the following non-limiting examples.

A cathode catalyst ink containing Pt-alloy catalyst with a loading of 0.2 mg Pt/cm2 was coated directly onto gas diffusion media (GDM) to form a wet cathode layer. A piece of expanded polytetrafluoroethylene (ePTFE) film (TETRATEX® supplied by Donaldson Company) was laminated to the surface of the wet cathode layer immediately after coating the cathode ink to form a reinforced cathode layer. The reinforced cathode layer was dried under an infrared (IR) lamp for 10 min. at 400° F.

A first thin film of NAFION® D2020 ionomer solution (available from E. I. DuPont de Nemours and Company (Wilmington, Del., US)) containing cerium (Ill) carbonate was coated on the surface of the dried catalyst coated substrate to form a first wet ionomer layer having a wet thickness of about 80 microns. A piece of expanded polytetrafluoroethylene (ePTFE) film was laminated to the surface of the first wet ionomer layer immediately after coating to form a reinforced ionomer layer. The reinforced ionomer layer was dried under an IR lamp for 6 min. at 400° F. and resulted in the reinforced ionomer layer having a dry thickness of from about 6-7 microns.

A second thin film of NAFION® D2020 ionomer solution containing cerium (Ill) carbonate was coated on the surface of the dried catalyst coated substrate to form a second wet ionomer layer having a wet thickness of about 60 microns. The second wet ionomer layer was dried under an IR lamp for 6 min. at 400° F. to form a second ionomer layer having a dry thickness of from about 4-5 microns. The reinforced cathode layer, reinforced ionomer layer, and the second ionomer layer together form a reinforced cathode coated substrate. The reinforced cathode coated substrate was annealed at 200° C. for 15 minutes in an inert nitrogen atmosphere.

An anode catalyst ink containing Pt/Graphitized Vulcan catalyst with a loading of 0.05 mg Pt/cm2 was coated directly onto gas diffusion media (GDM) to form a wet anode layer. A thin film of NAFION® D2020 ionomer solution was coated on the wet anode layer to form a ionomer layer. The substrate (GDM), anode layer and ionomer layer together form an anode coated substrate. The anode coated substrate was dried under an IR lamp for 4 min. at 400° F., which resulted in the ionomer layer having a dry thickness of about 0.9 microns.

The cathode coated substrate and the anode coated substrate were hot pressed together to form an improved MEA. The improved MEA was further assembled into a unitized electrode assembly to form an improved UEA.

A cathode catalyst ink containing Pt-alloy catalyst with a loading of 0.2 mg Pt/cm2 was coated directly onto gas diffusion media (GDM) to form a cathode layer. The cathode layer was dried under an infrared (IR) lamp for 4 min. at 400° F. A thin film of NAFION® D2020 ionomer solution containing cerium (Ill) carbonate was coated on the surface of the cathode layer to form a wet ionomer layer. The substrate (GDM), cathode layer, and ionomer layer together form the cathode coated substrate. The cathode coated substrate was dried under an IR lamp for 4 min. at 400° F., which resulted in the ionomer layer having a dry thickness of about 0.9 microns.

An anode catalyst ink containing Pt/Graphitized Vulcan catalyst with a loading of 0.05 mg Pt/cm2 was coated directly onto gas diffusion media (GDM) to form an anode layer. A thin film of NAFION® D2020 ionomer solution was coated on the anode layer to form an ionomer layer. The substrate (GDM), anode layer and ionomer layer together form an anode coated substrate. The anode coated substrate was dried under an IR lamp for 4 min. at 400° F., which resulted in the ionomer layer having a dry thickness of about 0.9 microns.

The cathode coated substrate, a standalone 18 micron-thick reinforced PFSA membrane, and the anode coated substrate were hot pressed together to form a reference MEA. The reference MEA was assembled into a unitized electrode assembly in the same manner as the improved MEA to form a reference UEA.

Figure 9:
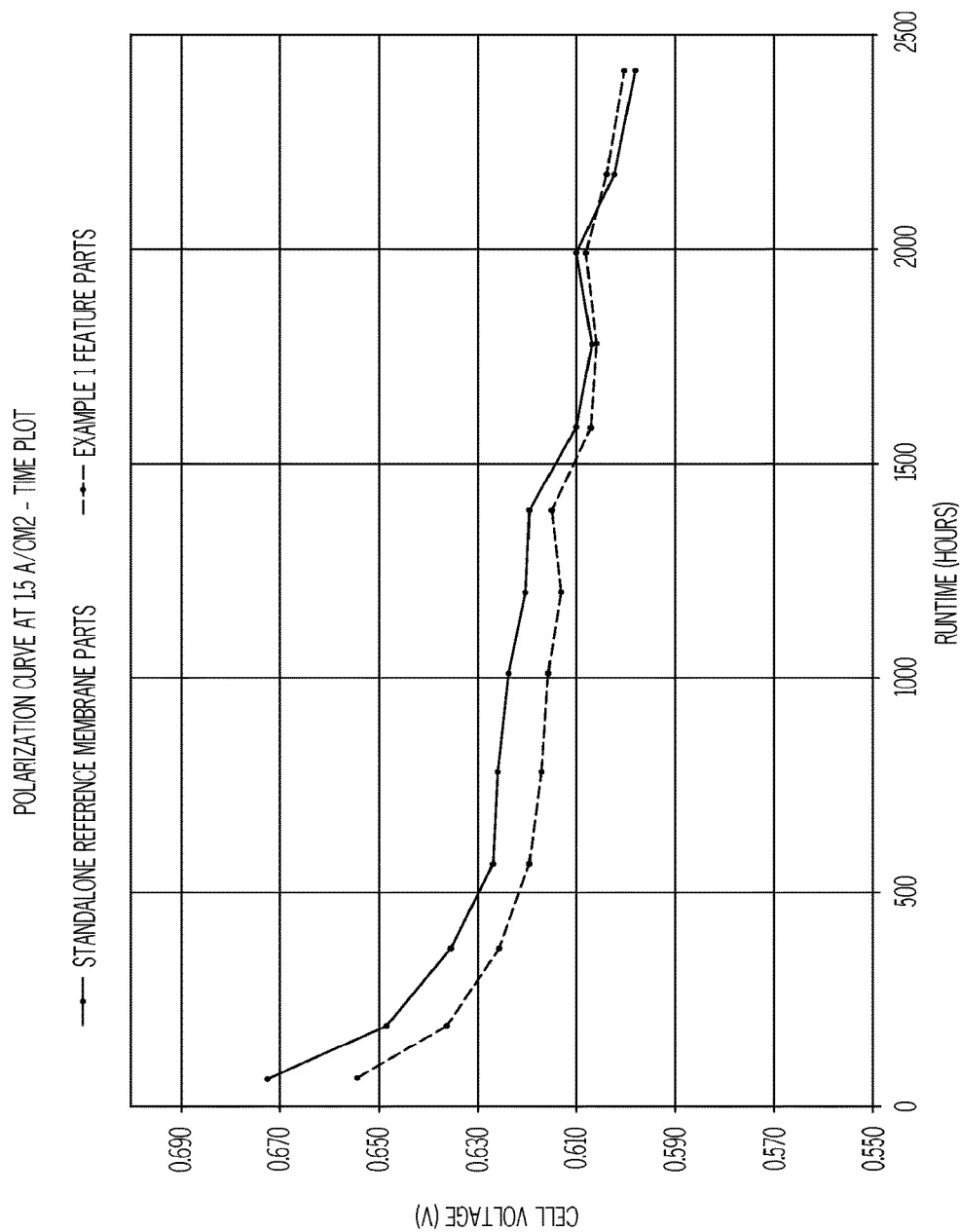
FIG. 9 graphically depicts a chart comparing cell voltage performance of a fuel cell formed according to aspects of the present disclosure.

The improved UEA and reference UEA were subjected to long term performance and durability testing. Referring to FIG. 9, depicted are polarization curves showing fuel cell performance over time. Testing for the polarization curves were conducted at a 1.5 A/cm2 current density, 80° C. stack temperature, an anode stoichiometry of 1.5, a cathode stoichiometry of 1.8, and outlet pressures of 191 kPa absolute. As shown, while the reference MEA had a slightly better cell voltage performance at the outset, the improved MEA ultimately showed a slower cell voltage degradation rate such that after about 1,750 hours, the performance between the improved MEA and reference MEA is about the same.

Figure 10:
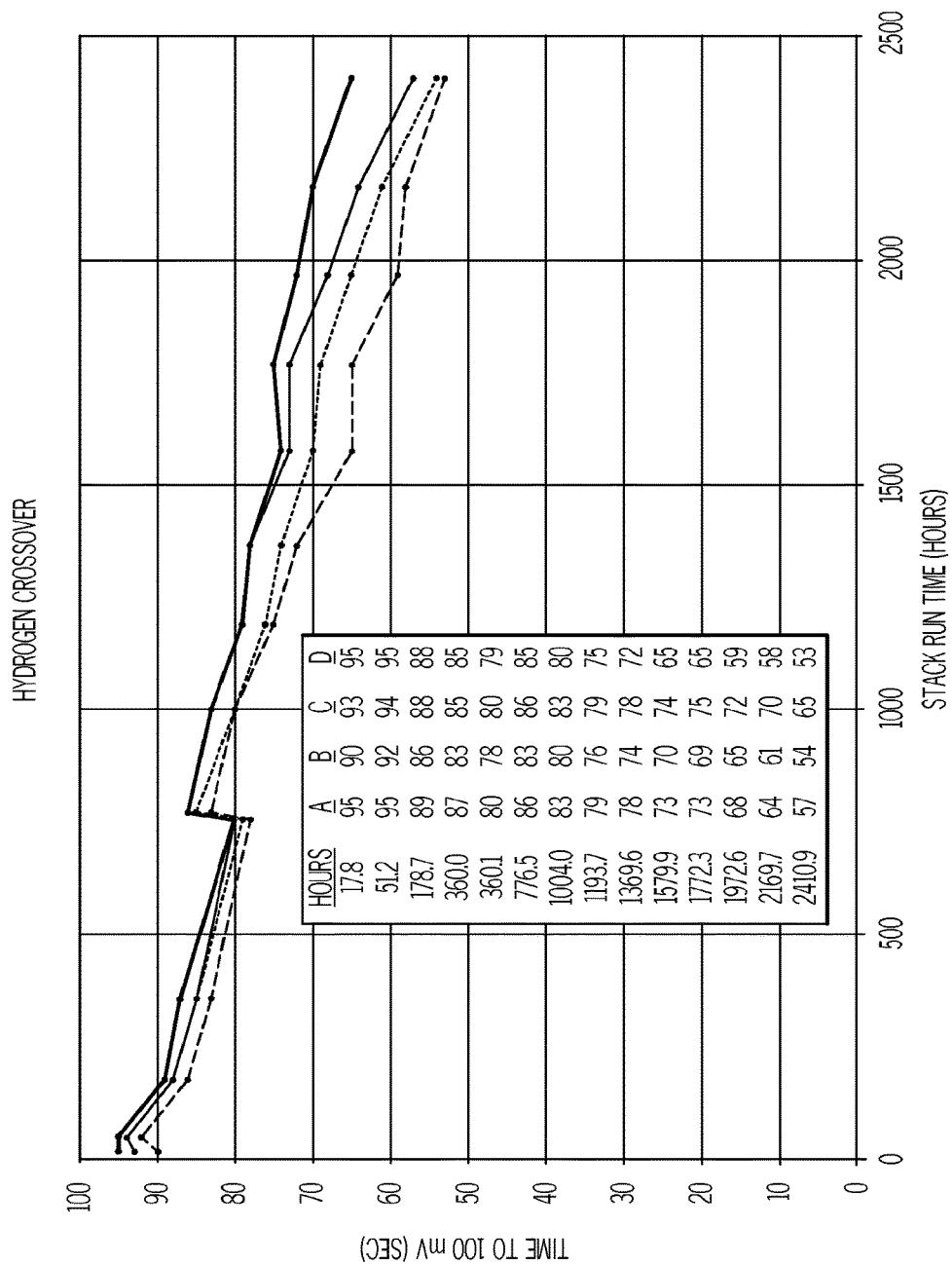
FIG. 10 graphically depicts a chart comparing durability performance of a fuel cell formed according to aspects of the present disclosure.

Referring to FIG. 10, stack durability testing was performed according to the U.S. Council for Automotive Research LLC's Accelerated Testing and Polarization Curve Protocols for PEM Fuel Cells, Protocol for Determining Cell/Stack Durability. The testing procedure for hydrogen crossover is based on an electrochemical detection of the molecular hydrogen passing through the membrane. For that purpose, the UEA is purged with hydrogen at the anode side and with air at the cathode side. Using the protocol, the UEA is brought to equilibrium state by holding current density steady at 0.4 A/cm2, flowing hydrogen to the anode at a 1.5 stoichiometry, flowing air to the cathode at a 4.0 stoichiometry, 134 kPa (abs) outlet pressure, and an operating temperature of 70° C. for 15 minutes. After 15 minutes of equilibration, the current density is dropped to O A/cm2 (OCV—Open Cell Voltage) with gases still on and held for 3 minutes. After the 3 minutes, the air to the cathode side is turned off and the cell voltage is recorded as a function of time. The cell voltage will decrease as a function of hydrogen permeation, which is an indication of degradation of the membrane. In particular, the time it takes the cell to drop to 100 mV is obtained from the data and used for comparing individual cells to others as well as observing the long-term durability of the membrane. A value of less than 20 seconds is generally considered the failure limit. As shown in the table depicted in FIG. 10, the run time was measured for improved UEAs to drop to 100 mVolts after hours of operation. After over 2,000 hours of operation, the four UEAs show a decrease in time to 100 mV; however, the decrease in time was within acceptable limits and show that the improved MEAs were durable for over 2400 hours.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A reinforced membrane electrode assembly comprising:
    a first catalyst coated substrate including a first electrode layer and a first porous reinforcement layer on the first electrode layer, the first electrode layer including an electrode ink on a surface of a first substrate with the first porous reinforcement layer located on a surface of the electrode ink, the electrode ink including a proton-transmissive ionomer and a catalyst, the proton-transmissive ionomer including an ionomer matrix with a plurality of electrically conductive support particles substantially evenly distributed throughout; and
    a reinforced membrane layer on the first catalyst coated substrate, the reinforced membrane layer including a first ionomer layer on a surface of the first porous reinforcement layer and a membrane porous reinforcement layer on the first ionomer layer, the first ionomer layer including the proton-transmissive ionomer and an at least partially fluorinated polymer electrolyte.

2. The reinforced membrane electrode assembly of claim 1, wherein the reinforced membrane layer further includes a second ionomer layer positioned on the membrane porous reinforcement layer.

3. The reinforced membrane electrode assembly of claim 2, further comprising a second catalyst coated substrate including a second electrode layer on a second substrate, the second catalyst coated substrate attached to the second ionomer layer.

4. The reinforced membrane electrode assembly of claim 3, further comprising an adhesive ionomer layer attaching the second catalyst coated substrate to the second ionomer layer.

5. The reinforced membrane electrode assembly of claim 3, further comprising a second porous reinforcement layer attached to the second electrode layer.

6. The reinforced membrane electrode assembly of claim 1, wherein the membrane porous reinforcement layer is imbibed or impregnated with the first ionomer layer.

7. The reinforced membrane electrode assembly of claim 1, wherein the first porous reinforcement layer is imbibed or impregnated with the first electrode layer.

8. The reinforced membrane electrode assembly of claim 1, further comprising a second catalyst coated substrate including a second electrode layer on a second substrate positioned on the membrane porous reinforcement layer such that the membrane porous reinforcement layer is adjacent the second electrode layer.

9. The reinforced membrane electrode assembly of claim 8, further comprising an adhesive ionomer layer located between the membrane porous reinforcement layer and the second electrode layer.

10. The reinforced membrane electrode assembly of claim 1, wherein the first substrate includes a diffusion media or a gas diffusion media, each having a carbon-based substrate.

11. The reinforced membrane electrode assembly of claim 1, wherein the catalyst of the electrode ink includes a precious metal coated onto the electrically conductive support particles, the precious metal including platinum, palladium, iridium, rhodium, ruthenium, and/or their alloys.

12. A fuel cell comprising:
    a reinforced membrane electrode assembly including:
        a first catalyst coated substrate including a first electrode layer and a first porous reinforcement layer on the first electrode layer, the first electrode layer including an electrode ink on a surface of a first substrate with the first porous reinforcement layer located on a surface of the electrode ink, the electrode ink including a proton-transmissive ionomer and a catalyst, the proton-transmissive ionomer including an ionomer matrix with electrically conductive support particles substantially evenly distributed throughout, and a reinforced membrane layer on the first catalyst coated substrate, the reinforced membrane layer including a first ionomer layer on a surface of the first porous reinforcement layer and a membrane porous reinforcement layer on the first ionomer layer, the first ionomer layer including the proton-transmissive ionomer and an at least partially fluorinated polymer electrolyte; and a first plate positioned on a substrate side of the first catalyst coated substrate.

13. The fuel cell of claim 12, wherein the reinforced membrane layer further includes a second ionomer layer on the membrane porous reinforcement layer.

14. The fuel cell of claim 13, further comprising:

a second catalyst coated substrate including a second electrode layer on a second substrate, the second catalyst coated substrate attached to the second ionomer layer; and a second plate positioned on a substrate side of the second catalyst coated substrate.

15. The fuel cell of claim 14, further comprising an adhesive ionomer layer attaching the second catalyst coated substrate to the second ionomer layer.

16. The fuel cell of claim 14, further comprising a second porous reinforcement layer attached to the second electrode layer.

17. The fuel cell of claim 12, wherein the membrane porous reinforcement layer is imbibed or impregnated with the first ionomer layer.

18. The fuel cell of claim 12, wherein the first porous reinforcement layer is imbibed or impregnated with the first electrode layer.

19. The fuel cell of claim 12, further comprising a second catalyst coated substrate including a second electrode layer on a second substrate positioned on the membrane porous reinforcement layer such that the membrane porous reinforcement layer is adjacent the second electrode layer.

20. The fuel cell of claim 19, further comprising an adhesive ionomer layer located between the membrane porous reinforcement layer and the second electrode layer.

* * * * *